(12) United States Patent
Hasegawa et al.

(10) Patent No.: US 8,953,101 B2
(45) Date of Patent: Feb. 10, 2015

(54) PROJECTOR AND CONTROL METHOD THEREOF

(75) Inventors: Fumihiro Hasegawa, Tokyo (JP); Shinichi Sumiyoshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/236,007

(22) PCT Filed: Jul. 26, 2012

(86) PCT No.: PCT/JP2012/069637
§ 371 (c)(1),
(2), (4) Date: Jan. 29, 2014

(87) PCT Pub. No.: WO2013/024705
PCT Pub. Date: Feb. 21, 2013

(65) Prior Publication Data
US 2014/0168525 A1    Jun. 19, 2014

(30) Foreign Application Priority Data

Aug. 18, 2011   (JP) .................................. 2011-178808

(51) Int. Cl.
  *H04N 5/74* (2006.01)
  *G03B 21/53* (2006.01)
  *H04N 9/31* (2006.01)

(52) U.S. Cl.
  CPC ................ *G03B 21/53* (2013.01); *H04N 9/317* (2013.01); *H04N 5/74* (2013.01); *H04N 9/3194* (2013.01)
  USPC .............................. 348/745; 348/744; 348/47

(58) Field of Classification Search
  USPC ............. 348/744, 745–747, 47–50, 177–178, 348/333.1, 347, 806; 353/7, 101, 94, 97, 353/69, 70, 121
  IPC ......................................................... H04N 5/74
  See application file for complete search history.

(56) References Cited

U.S. PATENT DOCUMENTS

| 7,226,173 | B2 * | 6/2007 | Aoyanagi | 353/101 |
| 7,690,797 | B2 | 4/2010 | Higashi | |
| 7,889,324 | B2 | 2/2011 | Yamamoto | |
| 8,126,286 | B2 * | 2/2012 | Imai | 382/275 |

(Continued)

FOREIGN PATENT DOCUMENTS

| JP | 06-027431 | 2/1994 |
| JP | 2004-347911 | 12/2004 |

(Continued)

OTHER PUBLICATIONS

International Search Report Issued on Nov. 6, 2012 in PCT/JP2012/069637 filed on Jul. 26, 2012.

(Continued)

*Primary Examiner* — Trang U Tran
(74) *Attorney, Agent, or Firm* — Oblon, Spivak, McClelland, Maier & Neustadt, L.L.P.

(57) ABSTRACT

A projector includes an image taking part that takes an image of an area that includes a target onto which an image is projected; a distance measuring part that calculates, from taken image data obtained by the image taking part, distance data concerning a distance between the target and the image taking part; a plane estimation part that estimates, from the distance data, a plane corresponding to the target; and a focusing adjustment part that adjusts focusing of the image to be projected, based on information concerning the plane.

13 Claims, 12 Drawing Sheets

(56) References Cited

U.S. PATENT DOCUMENTS

| | | |
|---|---|---|
| 8,186,835 B2 * | 5/2012 | Furui .................... 353/70 |
| 8,523,366 B2 * | 9/2013 | Takahashi .............. 353/69 |
| 2005/0179875 A1 | 8/2005 | Aoyanagi |
| 2007/0002287 A1 | 1/2007 | Matsumoto et al. |
| 2010/0045942 A1 | 2/2010 | Furui |
| 2010/0128231 A1 | 5/2010 | Furui |
| 2012/0320220 A1 | 12/2012 | Hasegawa |

FOREIGN PATENT DOCUMENTS

| | | |
|---|---|---|
| JP | 2005-070687 | 3/2005 |
| JP | 2005-181726 | 7/2005 |
| JP | 2005-229415 | 8/2005 |
| JP | 2005-234350 | 9/2005 |
| JP | 2005-303493 | 10/2005 |
| JP | 2006-010945 | 1/2006 |
| JP | 2007-264413 | 10/2007 |
| JP | 2007-271760 | 10/2007 |
| JP | 2009-156646 | 7/2009 |
| JP | 2009-276073 | 11/2009 |
| JP | 2010-044255 | 2/2010 |
| JP | 4422074 | 2/2010 |
| WO | 2013/005857 A1 | 1/2013 |

OTHER PUBLICATIONS

U.S. Appl. No. 14/129,228, filed Dec. 24, 2013, Hasegawa, et al.
Extended European Search Report issued on Aug. 5, 2014 in the corresponding European Application No. 12823405.1.

* cited by examiner

… (1)

PROJECTOR AND CONTROL METHOD THEREOF

TECHNICAL FIELD

The present invention relates to a projector and a control method thereof.

BACKGROUND ART

A projector is a device for projecting an image onto a target such as a screen. There is a projector which, when projecting an image, measures a distance to a target, and adjusts focusing of an image to be projected. Further, there is a projector which takes a projected image, and adjusts focusing of the image based on the taken image.

Patent reference No. 1 (mentioned later) discloses a technique of using an active sensor, projecting infrared rays onto a target, measuring a distance to the target from the light reception intensity of the reflected light, and adjusting focusing based on the distance.

Patent reference No. 2 (mentioned later) discloses a technique of taking an image of a projected focusing pattern, detecting brightness differences of all the pixels of the taken image data from the adjacent pixels, calculating the sum total of the absolute values of the brightness differences, and moving a focusing lens at a position having the maximum value of the sum total, and thus carrying out automatic focusing adjustment.

Patent reference No. 3 (mentioned later) discloses a technique (mountain climbing autofocus technique) of receiving reflected light of a projected image by a light reception sensor, taking out high frequency components of an electric signal output from the light reception sensor, calculating contrast of an image signal (image data) obtained from integrating and/ or the like of the high frequency components and obtaining the position having the maximum contrast as an in-focus point.

When there is an obstruction (a presenter, a desk, or the like) between a projector and a target, or when a wall or the like is close to a side of a target opposite to a side onto which an image is projected, there is a case where an error is included in measurement of the distance to the target carried out using detection of a signal input level of a light reception element, according to the technique disclosed by Patent reference No. 1. Thus, focusing adjustment may not be achieved. Further, according to the techniques disclosed by Patent references Nos. 2 and 3, there is a case where the brightness or the contrast concerning an obstruction has the maximum value, and thus, focusing adjustment may not be achieved using brightness or contrast.

SUMMARY OF INVENTION

According to one aspect of the present invention, a projector is provided having an image taking part that takes an image of an area including a target onto which an image is being projected; a distance measuring part that calculates distance data concerning a distance between the target and the image taking part; a plane estimation part that estimates from the distance data a plane corresponding to the target; and a focusing adjustment part that adjusts focusing of the image being projected based on information concerning the plane.

Other objects, features and advantages of the present invention will become more apparent from the following detailed description when read in conjunction with the accompanying drawings.

DESCRIPTION OF EMBODIMENTS

An object of the embodiments discussed herein is to provide a projector that can carry out adjustment of focusing of an image being projected even when an obstruction exists between the projector and a target or when a wall or the like is close to the back of the target.

Projectors according to the embodiments will be described in detail, each of which approximates a target onto which an image is being projected by a plane and carries out adjustment of focusing the image being projected.

(Configuration of Projector)

Figure 1:
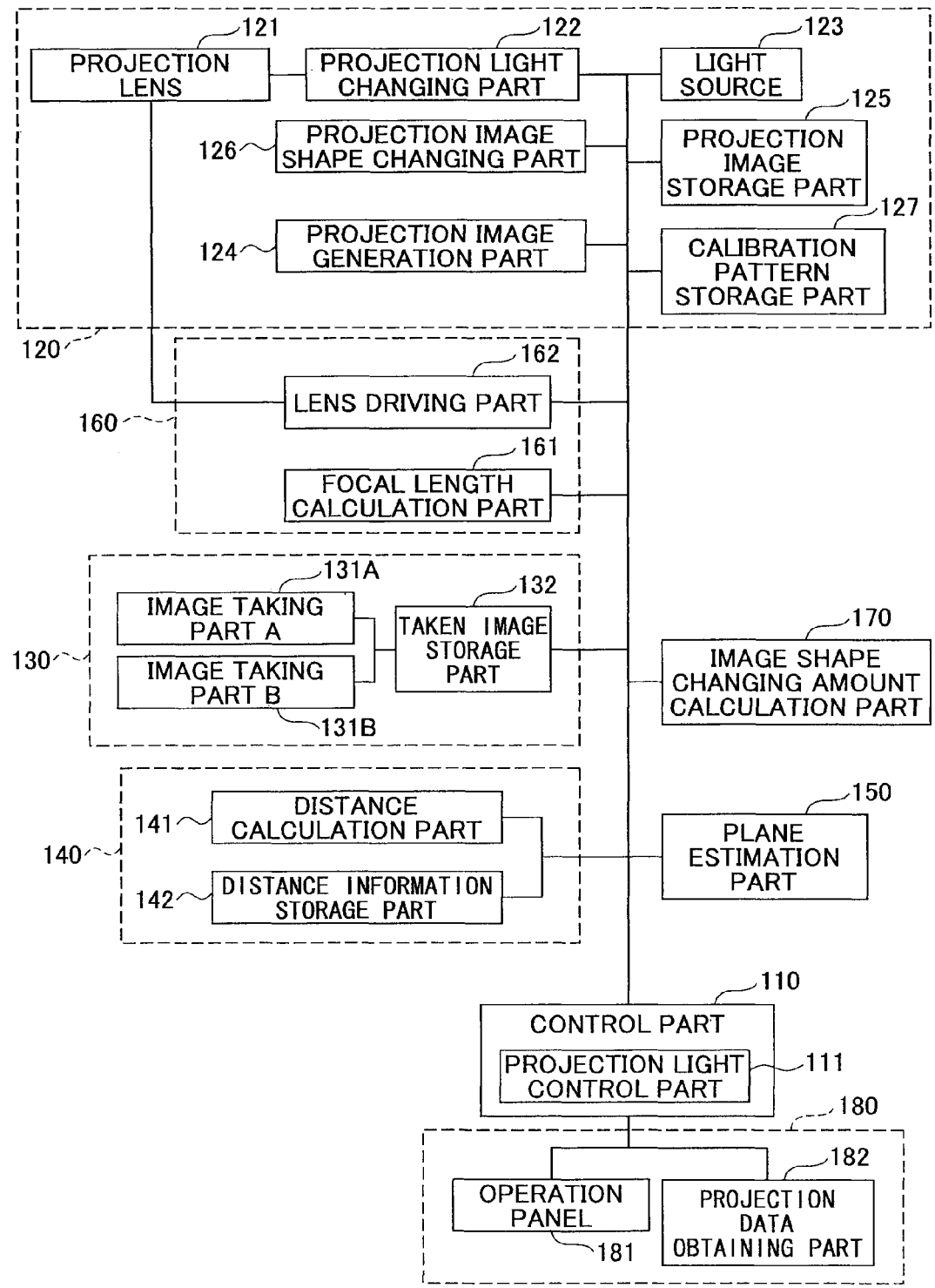
FIG. 1 shows a general configuration of one example of a projector.

FIG. 1 shows a general configuration of one example of a projector according to the embodiments.

In FIG. 1, a projector 100 includes a control part 110, a projection part 120, an image taking part 130, a distance measuring part 140, a plane estimation part 150, a focusing adjustment part 160, an image shape changing amount calculation part 170 and an interface (I/F) part 180.

The projector 100 takes an image of a target onto which an image is being projected (hereinafter, referred to as a "projection target") and calculates distance data, using the image taking part 130 and the distance measuring part 140. The projector 100 estimates a plane corresponding to the projection target from the distance data, using the plane estimation part 150. The projector 100 moves a projection lens 121 based on information concerning the estimated plane and so forth, and adjusts focusing (focal point) of an image being projected, using the focusing adjustment part 160.

As the projection target, any thing can be used as long as an image can be projected onto the surface thereof, such as a screen, a wall, a whiteboard, and so forth.

The control part 110 carries out control of the entirety of the projector 100. The control part 110 controls the projection part 120 and so forth. The control part 110 controls operations of a projection light changing part 122 using a projection light control part 111, and controls light intensity when projecting an image.

The projection part 120 projects an image onto the projection target. The projection part 120 includes the projection lens 121, the projection light changing part 122, a light source 123, a projection image generation part 124, a projection image storage part 125, a projection image shape changing part 126 and a calibration pattern storage part 127. The projection part 120 projects an image stored in the projection image storage part 125 onto the projection target using the projection lens 121, the light source 123 and so forth.

The image taking part 130 forms an image of an area including the projection target on an image pickup device (image sensor), and obtains a pixel output signal of the image sensor as taken image data. The image taking part 130 includes an image taking part A (131A), an image taking part B (131B) and taken image storage part 132. The image taking part A (131A) and the image taking part B (131B) function as a stereo camera.

The "stereo camera" (described later using FIG. 5) includes two image taking lenses (132a and 132b) and two image sensors (133a and 133b) in the image taking part A (131A) and the image taking part B (131B), respectively, and photographs the projection target with the two image taking lenses simultaneously. The image taking lenses make images of the projection target incident on the image sensors, respectively. The image sensors have light reception surfaces on which plural light reception elements (pixels) are arranged like a grid, and form images of the area including the projection target incident through the image taking lenses on the light reception surfaces, respectively. As the image sensors, solid state image sensors, organic image sensors or the like may be used.

The distance measuring part 140 measures the distance from the projector 100 to the projection target. The distance measuring part 140 includes a distance calculation part 141 and a distance information storage part 142. The distance measuring part 140 calculates the distance to the projection target according to the principle of triangulation. Details will be described later in (operations of measuring distance).

The plane estimation part 150 estimates a plane corresponding to the projection target. The plane estimation part 150 approximates the projection target by a corresponding plane recursively. A specific method of approximating by a plane may be a method (a regression analysis method) of, after approximately estimating a plane based on plural positions, excluding positions that are apart from the estimated plane by a predetermined distance, and again estimating a plane. Details will be described later in (operations of estimating plane).

The focusing adjustment part 160 focuses the projection lens 121 on the projection target. The focusing adjustment part 160 includes a focal length calculation part 161 and a lens driving part 162. Details will be described later in (operations of focusing adjustment).

The image shape changing amount calculation part 170 calculates information concerning correction (image processing such as magnification, size reduction, keystone correction, and/or the like, simply referred to as "correction") of an image to be projected. The image shape changing amount calculation part 170 calculates information concerning correction based on distance data calculated by the distance measuring part 140 and/or information concerning the plane estimated by the plane estimation part 150. Details will be described later in (operations of correcting image to be projected).

The I/F part 180 carries out input/output of information from/to the outside of the projector 100. The I/F part 180 includes an operation panel 181 and a projection data obtaining part 182. The operation panel 181 is a user interface which a user operates. The projection data obtaining part 182 inputs data concerning an image to be projected from an external personal computer (PC) or the like.

(Function of Projector)

One example of functions of the projector 100 will be described using FIG. 2.

Figure 2:
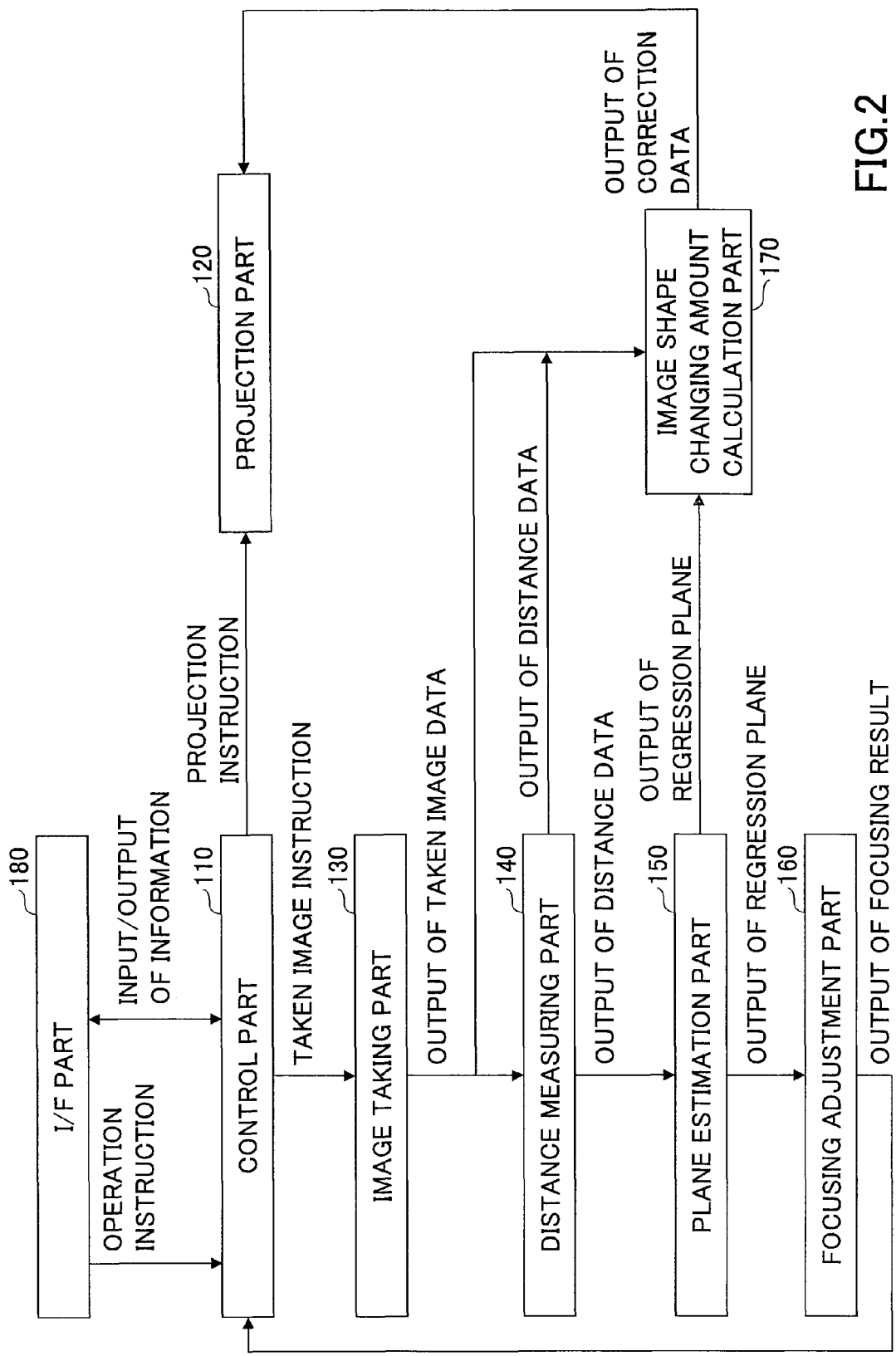
FIG. 2 is a functional block diagram showing one example of functions of the projector.

FIG. 2 is a functional block diagram of the projector 100.

In FIG. 2, the control part 110 outputs a signal for giving an instruction to start projecting an image to the projection part 120 for starting projection of an image in response to an instruction for operation given via the I/F part 180 (the operation panel 181 or the like). Further, the control part 110 outputs a signal for giving an instruction to start taking an image to the image taking part 130.

The projection part 120 projects onto a projection target a calibration pattern stored in the calibration pattern storage part 127 or an image stored in the projection image storage part 125 via the projection lens 121. Further, the projection part 120 corrects (changes the shape of) an image to be projected based on information concerning correction calculated by the image shape changing amount calculation part 170 using the projection image shape changing part 126, and projects the corrected image.

The image taking part 130 takes an image of an area including the projection target using the stereo camera (the image taking parts A and B (131A and 131B)), and obtains two sets of taken image data. Further, the image taking part 130 outputs the obtained taken image data to the distance measuring part 140 and the image shape changing amount calculation part 170. The "taken image data" means data obtained from brightness and so forth of light received by the light reception elements being converted into an electric signal (pixel output signal).

The distance measuring part 140 calculates distance data corresponding to plural positions (hereinafter, referred to as "corresponding points") on the surface of the projection target based on the two sets of taken image data. Further, the distance measuring part 140 outputs the distance data to the plane estimation part 150 and the image shape changing amount calculation part 170. The "distance data" means data concerning the distances from the projector (the image taking part 130) to the projection target (corresponding points).

The plane estimation part 150 calculates regression plane data concerning a plane corresponding to the projection target based on the distance data calculated by the distance measuring part 140. Further, the plane estimation part 150 outputs the regression plane data to the image shape changing amount calculation part 170 and the focusing adjustment part 160. The "regression plane data" means data concerning a plane including plural positions in a three-dimensional space calculated according to the regression analysis method.

The focusing adjustment part 160 moves the projection lens 121 based on information concerning the plane estimated by the plane estimation part 150 and/or the like, and adjusts focusing of the image being projected. Further, the focusing adjustment part 160 outputs to the control part 110 information concerning a result of the focusing adjustment.

The image shape changing amount calculation part 170 generates image data concerning the area including the projection target using the taken image data obtained by the image taking part 130. Further, the image shape changing amount calculation part 170 calculates correction data based on the regression plane data estimated by the plane estimation part 150 and the distance data calculated by the distance measuring part 130, and outputs the correction data to the projection part 120 (the projection image shape changing part 126). The "image data" means data concerning an image obtained from carrying out a digital process on the pixel output signal that is output by the image sensor(s). Further the "correction data" means data concerning correction of the image to be projected by the projection part 120.

(Operations of Extracting Corresponding Points)

Using FIGS. 3, 4A, 4B and 4C, operations of the distance measuring part 140 extracting corresponding points based on the two sets of taken image data obtained by the stereo camera of the image taking part 130 will be described.

Figure 3:
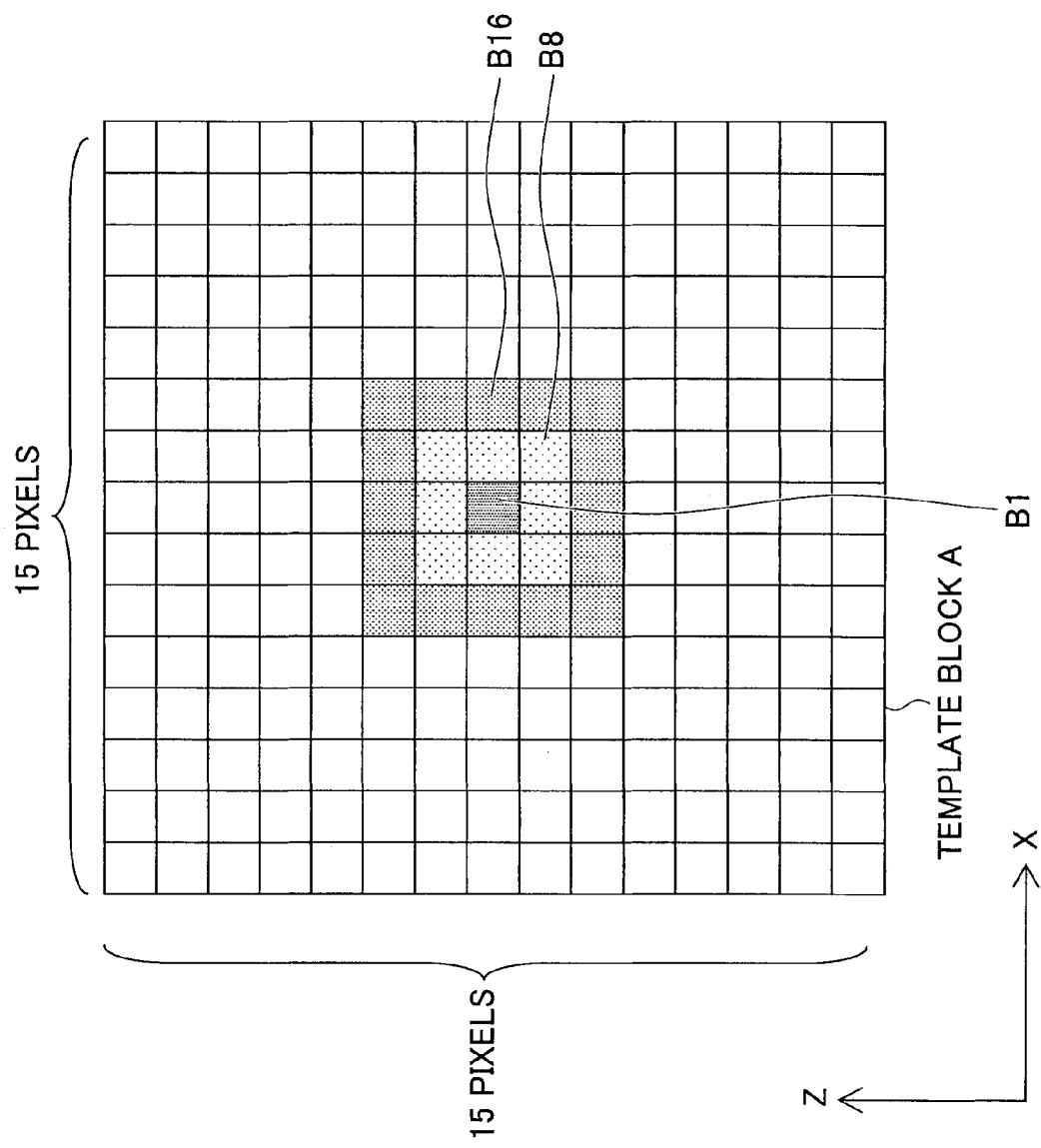
FIG. 3 illustrates a luminance component of a pixel output signal that is output for each pixel.

FIG. 3 illustrates the luminance components of the pixel output signal that are output for the respective pixels based on the taken image data obtained from the image of the projection target being taken by the stereo camera of the image taking part 130. In FIG. 3, the x-direction is a direction of a row or a column of pixels (light reception elements) arranged like a grid. The z-direction is a direction of the column or the row of the pixels (light reception elements) arranged like a grid, perpendicular to the x-direction.

In FIG. 3, the distance measuring part 140 first selects any pixel (B1 in FIG. 3) as a selected point from one of the two sets of taken image data obtained by the stereo camera (hereinafter, referred to as "taken image data A").

Next, the distance measuring part 140 compares the luminance component of the selected point with those of the peripheral 8 pixels (in FIG. 3, B8) in the taken image data A. At this time, the selected point is extracted as a feature point $(x_A, z_A)$ in a case where the luminance component of the selected point is larger than that of every one of the eight peripheral pixels or is smaller than that of every one of the eight peripheral pixels. Further, the distance measuring part 140 extracts an area, as a template block A, having four sides each having 15 pixels with the center that is the feature point, as shown in FIG. 3.

It is noted that, as the luminance components to be thus compared by the distance measuring part 140, only the signal of the green components that indicate the luminance may be used in an approximative way in a case where the image taking part 130 outputs the pixel output signal as an RGB signal (signal having the components of red, green and blue corresponding to the three primary colors). Further, the comparison of the luminance components may be comparing the pixel of the selected point with the peripheral 16 pixels (B16 in FIG. 3) in their luminance components.

Next, the distance measuring part 140 selects, from the other of the two sets of taken image data taken by the stereo camera (hereinafter, referred to as "taken image data B"), any pixel as a selected point $(x_B, z_B)$. Further, the distance measuring part 140 selects an area having four sides each having 15 pixels with the center that is the selected point as a template block B. The distance measuring part 140 calculates the sum total of the luminance (or brightness) for the respective template blocks A and B, and compares the thus obtained respective sum totals. As specific examples of a method of the comparison, Sum of Absolute Distance (SAD) described later, Squared Sum of Differences (SSD) described later and so forth may be cited.

Next, the selected point $(X_B, z_B)$ is selected from the template block B, at which point the difference between the respective sum totals of the luminance (or brightness) is minimum in the comparison between the template blocks A and B. Then, when this difference between the respective sum totals of the luminance (or brightness) is equal to or less than a predetermined value, the feature point $(x_A, z_A)$ of the taken image data A and the selected point $(x_B, z_B)$ of the taken image data B are associated together, and the feature point $(x_A, z_A)$ (selected point $(X_B, z_B)$) is extracted as a corresponding point $(x_{AB}, z_{AB})$. The "predetermined value" may be a value corresponding to the distance between the projection target and the projector or a value corresponding to the depth of field. Further, the predetermined value may also be a value determined according to a numerical calculation, an experiment and/or the like.

In the extraction of the corresponding points, the distance measuring part 140 compares any one of the feature points extracted from the taken image data A with the selected points of the taken image data B. At this time, the distance measuring part 140 extracts the plural corresponding points (hereinafter, referred to as a "three-dimensional point group").

It is noted that "SAD" is a method of obtaining the sum total of differences of absolute values, for the above-mentioned comparison of sum totals. Assuming that a pixel is expressed by a relative coordinate (x, z), $I_A$ (x, z) denotes a comparison value (luminance component or the like) of a pixel (x, z) of the taken image data A and $I_B$ (x, z) denotes a comparison value (luminance component or the like) of a pixel (x, z) of the taken image data B, AD (sum total of differences) is obtained from the following formula (1):

$$AD = \sum_{i=-7}^{7} \sum_{k=-7}^{7} |I_A(i+x_A, k+z_A) - I_B(i+x_B, k+z_B)| \quad (1)$$

On the other hand, "SSD" is a method of obtaining the sum total of squares of differences. SD (sum total of squares of differences) can be obtained from the following formula (2):

$$SD = \sum_{i=-7}^{7} \sum_{k=-7}^{7} \{I_A(i+x_A, k+z_A) - I_B(i+x_B, k+z_B)\}^2 \quad (2)$$

Figure 4A:
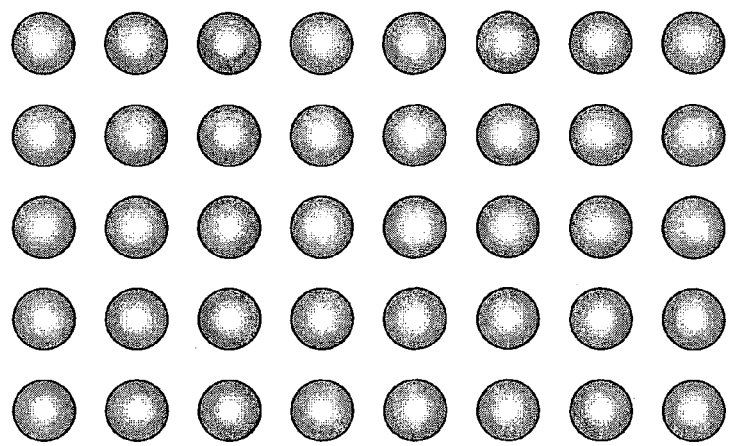
FIGS. 4A, 4B and 4C illustrate examples of predetermined patterns.
Figure 4B:
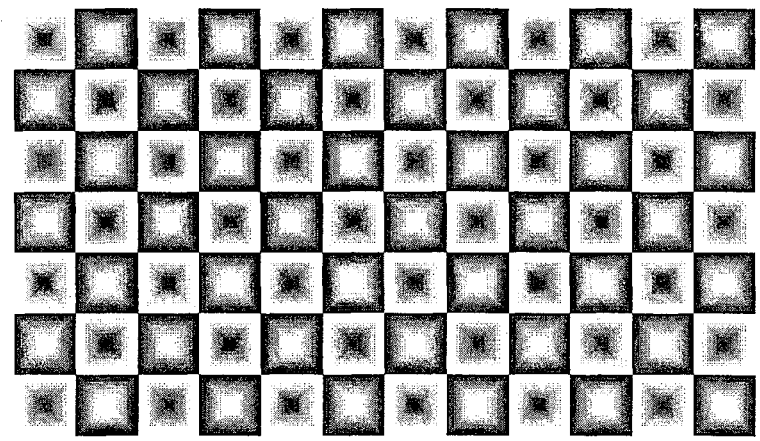
Figure 4C:
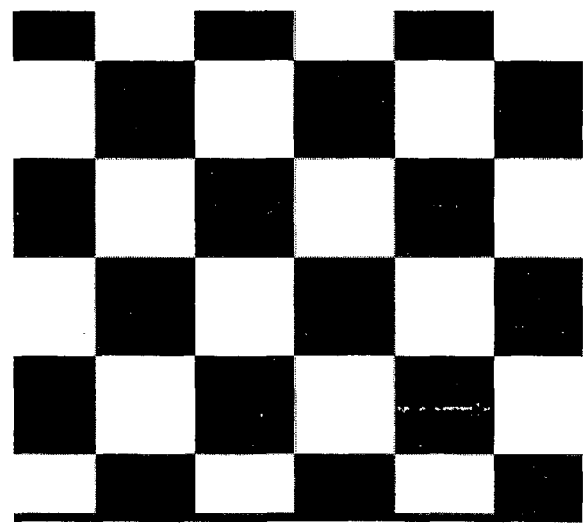

FIGS. 4A, 4B and 4C show examples of a predetermined pattern (calibration pattern) to be projected onto the projection target.

The distance measuring part 140 may use a pattern having plural circles or the like as a predetermined pattern Pk to be projected onto the projection target when extracting the corresponding points. At this time, the distance measuring part 140 may extract the centers of the plural circles or the like as the corresponding points based on at least one item of information of the colors, the brightness, the edge strengths and/or the like of the taken image data obtained from taking an image of the predetermined pattern Pk. FIG. 4A shows one example of the pattern of the plural circles. The diameter of each of the plural circles to be projected may be in a range from a size such that an image formed on the image sensor by one circle is the same as one light reception element (1 pixel) through a size such that three circles can be projected onto the projection target.

Further, the distance measuring part 140 may use a check pattern as the predetermined pattern Pk. At this time, the distance measuring part 140 may extract edges (the corners of the squares) or the like of the squares of the check pattern as the corresponding points based on at least one item of information of the colors, the brightness, the edge strengths and/or the like of the taken image data obtained from taking an image of the predetermined pattern Pk. FIGS. 4B and 4C show examples of the check pattern.

(Operations of Calculating Distance Data)

Using FIG. 5, operations of the distance measuring part 140 calculating the distance data concerning the distances from the image taking part 130 (projector 100) to the corresponding points (projection target) using the stereo camera of the image taking part 130 will be described.

Figure 5:
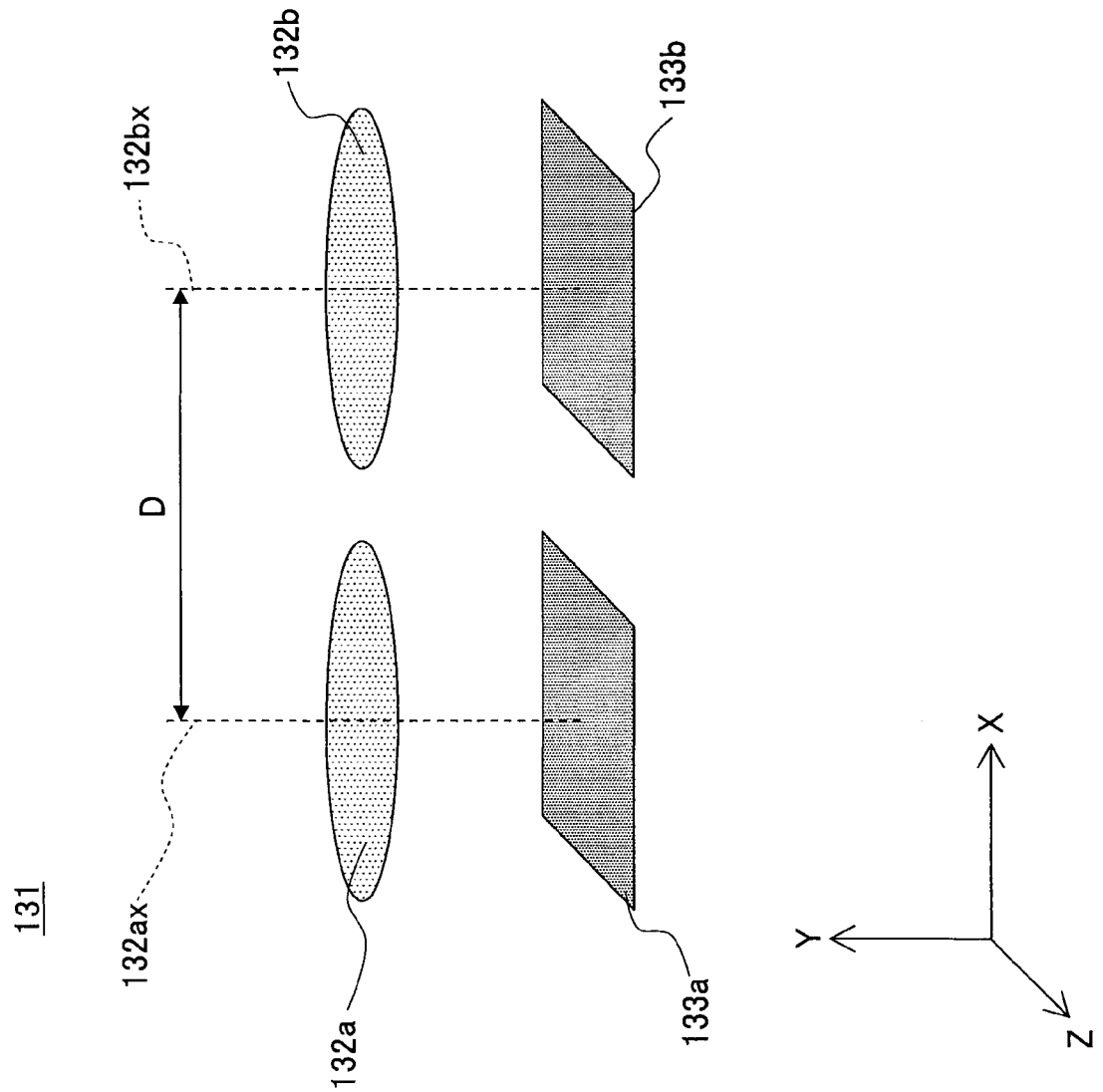
FIG. 5 is a magnified view illustrating one example of a part of a stereo camera.

FIG. 5 is a magnified view illustrating one example of a part of the stereo camera.

In FIG. 5, the stereo camera 131 has the first image taking lens 132a and the second image taking lens 132b. The stereo camera 131 further has the first image sensor 133a and the second image sensor 133b arranged in a back direction (i.e., the direction opposite to the direction of the projection target) of the first and second image taking lenses 132a and 132b, respectively. As the image sensors 133a and 133b, area sensors (that may also be called "two-dimensional sensors") or the like may be used.

The first and second image taking lenses 132a and 132b are separated by a predetermined space D (hereinafter, referred to as a "base length"). The optical axis 132ax of the first image taking lens 132a and the optical axis 132bx of the second image taking lens 132b are parallel. The first image sensor 133a and the second image sensor 133b have light reception surfaces, on which images of the projection target are formed, on the front sides (opposite to the back sides), respectively. The optical axis 132ax of the first image taking lens 132a and the optical axis 132bx of the second image taking lens 132b are positioned to be coincident with the centers of the diagonal lines of the light reception surfaces of the first image sensor 133a and the second image sensor 133b, respectively.

The distance measuring part 140 extracts the plural corresponding points by the above-described (operations of extracting corresponding points) based on the two sets of taken image data taken by the stereo camera 131. Further, the distance measuring part 140 (distance calculation part 141) calculates the distance data concerning the distances from the projector 100 (the image taking part 130) to the projection target (the corresponding points) according to the principle of triangulation for the extracted plural corresponding points.

Specifically, the first image of the projection target obtained through the first image taking lens 132a is formed on the light reception surface of the first image sensor 133a. On the other hand, the second image of the projection target obtained through the second image taking lens 132b is formed on the light reception surface of the first image sensor 133b. The first and second images of the projection target are formed on the respective light reception surfaces having a difference in position therebetween due to a parallax Δ. At this time, the image sensors 133a and 133b carry out photoelectric conversion on the brightness of the light of the first and second images into amounts of electric charge, and output the amounts of electric charge to the distance measuring part 140 as the pixel output signals. The distance measuring part 140 compares the pixel output signals of the image sensors 133a and 133b, and detects the parallaxes Δ for the corresponding points.

The following formula (3) holds (the principle of triangulation) when Δ denotes the parallax, D denotes the base length, L denotes the distance from the projector 100 (image taking part 130) to the projection target (the corresponding point) and f denotes the focal length of the image taking lens 132a or the like, under the condition of L≫f:

$$L = D \cdot f / \Delta \quad (3)$$

In this case, D and f are known. The distance measuring part 140 (the distance calculation part 141) calculates the distances L from the detected parallaxes Δ according to the formula (3). Further, the distance measuring part 140 obtains the calculated distances L as the distance data corresponding to the corresponding points, and stores the distance data in the distance information storage part 142.

(Operations of Estimating Plane)

Using FIG. 6, operations of the plane estimation part 150 recursively approximating a plane corresponding to the projection target according to the regression analysis method will be described.

Figure 6:
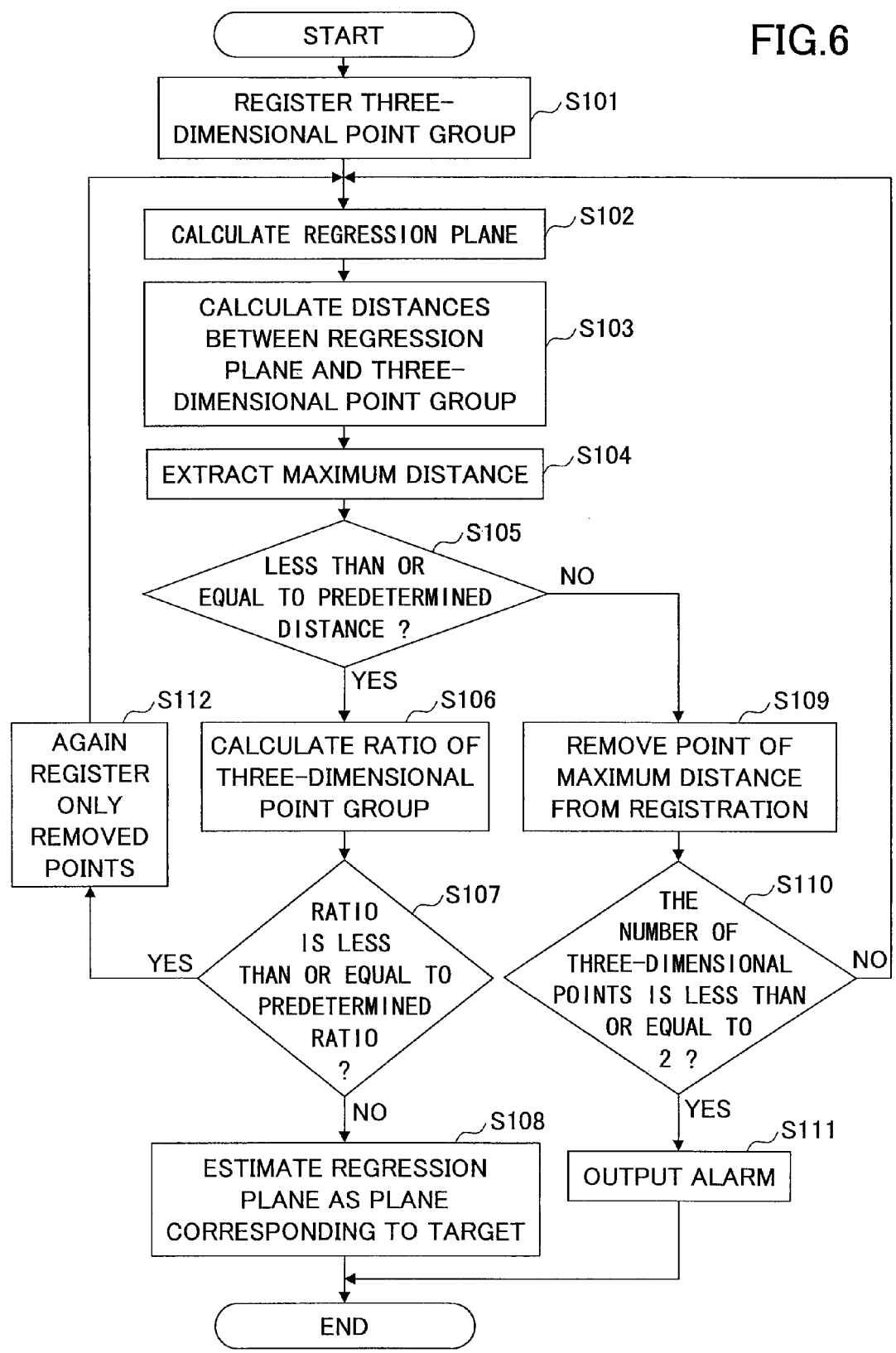
FIG. 6 is a flowchart showing one example of operations of estimating a plane.

FIG. 6 is a flowchart showing one example of operations of the plane estimation part 150.

In FIG. 6, the control part 110 inputs (registers) the distance data of the three-dimensional point group (corresponding points) calculated by the distance measuring part 140 to the plane estimation part 150 (step S101). Then, the process proceeds to step S102.

In step S102, the plane estimation part 150 calculates regression plane data concerning a plane corresponding to the projection target based on the distance data. A method of calculating regression plane data in step S102 will now be described specifically.

In the above-described (operations of extracting corresponding points), the n corresponding points ($x_{ABi}$, $y_{ABi}$, $z_{ABi}$) (i=1 through n) are calculated as the three-dimensional point group. It is noted that the y-axis direction is the optical axis direction (y-direction in FIG. 5) of the stereo camera 131 of the image taking part 130. Further, $y_{ABi}$ is the y-component of the distance L between the projection target (corresponding point ($x_{ABi}$, $z_{ABi}$)) and the projector 100 (the image taking part 130).

In order to calculate a regression plane from the three-dimensional point group according to the regression analysis method, the plane estimation part 150 first defines an equation of the regression plane as y=ax+bz+c. Then, the following formula (4) holds for the regression plane and the three-dimensional point group:

$$Y = X\beta + \epsilon \quad (4)$$

The variables in the formula (4) are those in the formula (5):

$$Y = \begin{pmatrix} y_{AB1} \\ y_{AB2} \\ \vdots \\ y_{ABn} \end{pmatrix}, X = \begin{pmatrix} x_{AB1} & z_{AB1} & 1 \\ x_{AB2} & z_{AB2} & 1 \\ & \vdots & \\ x_{ABn} & z_{ABn} & 1 \end{pmatrix}, \beta = \begin{pmatrix} a \\ b \\ c \end{pmatrix}, \varepsilon = \begin{pmatrix} e_1 \\ e_2 \\ \vdots \\ e_n \end{pmatrix} \quad (5)$$

At this time, $e_i$ denotes the residual.

Next, the normal equation is the formula (6):

$$X^T Y = (X^T X) \beta \quad (6)$$

Thus, β is the formula (7):

$$\beta = (X^T X)^{-1} X^T Y \quad (7)$$

Then, using the least-square method, the constants "a", "b" and "c" with which the sum of squares of the residuals $e_i$ becomes minimum are calculated, and thus, it is possible to obtain the regression plane (y=ax+bz+c). The plane estimation part 150 obtains, as the regression plane data, the constants "a", "b" and "c" of the equation (y=ax+bz+c) of the regression plane.

When calculation of the regression plane data has been thus completed, the process proceeds to step S103.

Next, in step S103 of FIG. 6, the distances $D_{ABi}$ between the regression plane and the three-dimensional point group are calculated. Specifically, the distances $D_{ABi}$ are calculated by the following formula (8) as the distances from the corresponding points ($x_{ABi}$, $Y_{ABi}$, $z_{ABi}$) to the plane (αx+βy+γz+δ=0).

$$D_{ABi} = \frac{|\alpha x_{ABi} + \beta y_{ABi} + \gamma z_{ABi} + \delta|}{\sqrt{\alpha^2 + \beta^2 + \gamma^2}} \quad (8)$$

When the calculation of the distances between the regression plane and all of the points of the three-dimensional point group has been thus completed, the process proceeds to step S104.

In step S104, the distance $D_{MAX}$ of the corresponding point is extracted which is the maximum one of the absolute values of the distances $D_{ABi}$ calculated in step S103. When the extraction of the distance $D_{MAX}$ has been thus completed, the process proceeds to step S105.

In step S105, the distance $D_{MAX}$ is compared with a predetermined distance. When the distance $D_{MAX}$ is less than or equal to the predetermined distance, the process proceeds to step S106. When the distance $D_{MAX}$ exceeds the predetermined distance, the process proceeds to step S109. The "predetermined distance" may be a value corresponding to the distance between the projection target and the projector 100. Further, the "predetermined distance" may also be a value corresponding to the depth of field.

In step S106, the ratio of the number of the points of the three-dimensional point group which exist in a predetermined range from the center of the taken image area (the image of which has been taken by the image taking part 130) to the number of the points of the three-dimensional point group of the entirety of the taken image area is calculated. It is noted that the number of the points of the three-dimensional point group of the entirety of the taken image area is kept unchanged even when the point corresponding to the distance $D_{MAX}$ has been removed in step S109 (described later). However, when step S112 (described later) has been carried out, the number of the points of the three-dimensional point group of the entirety of the taken image area is replaced by the number of the points of the three-dimensional point group which have been thus input (registered) as new distance data in step S112. When calculation of the ratio has been thus completed, the process proceeds to step S107.

In step S107, the ratio calculated in step S106 is compared with a predetermined ratio. In a case where the calculated ratio exceeds the predetermined ratio, the process proceeds to step S108. In the other case, the process proceeds to step S112. The "predetermined ratio" may be the ratio of the predetermined range that is set in step S106 to the entirety of the taken image area. Further, the predetermined ratio may be a ratio of an area, which may be regarded to include the projection target at the center of the taken image area, to the entirety of the taken image area, obtained from numerical calculation, an experiment and/or the like.

In steps S106 and S107, it is determined whether the three-dimensional point group is a point group that indicates positions on the projection target or a point group that indicates positions on a wall that exists on the back side of the projection target or the like. Thus, in step S106 and so forth, other than the above-mentioned comparison with the predetermined ratio, it is also possible to carry out the determination based on the variance of the points of the three-dimensional point group.

Specifically, for example, in a case where the estimated plane corresponds to a wall that exists on the back side of the projection target, points on the projection target (instead of the points on the wall or the like) may be removed in step S109 repetitively in repetitive loop operations of steps S105 NO→S109→S110→S102 through S105. As a result, only the points on the wall or the like may remain. The variance of the points of the three-dimensional point group on the projection target must be smaller than the variance of the points of the three-dimensional point group on the wall on the back side. Thus, it is possible to determine whether the three-dimensional point group is one that indicates positions on the surface of the projection target, by determining whether the variance of the points of the three-dimensional point group is smaller than a predetermined threshold. The "predetermined threshold" may be determined by a numerical calculation, an experiment and/or the like.

It is noted that the variance is obtained by the following formula:

$$v = v_x + v_y + v_z = E(x^2) - \{E(x)\}^2 + E(y^2) - \{E(y)\}^2 + E(z^2) - \{E(z)\}^2$$

In this formula, v denotes variance, $v_x$ denotes variance on the x-axis, $v_y$ denotes variance on the y-axis and $v_z$ denotes variance on the z-axis. E( ) denotes an average, and x, y and z denote an x coordinate value, a y coordinate value and a z coordinate value, respectively.

Returning to FIG. 6, and then, when it has been determined that the three-dimensional point group is one that indicates positions on the surface of the projection target in step S107, the process proceeds to step S108. In the other case, the process proceeds to step S112.

Next, in step S108, the regression plane calculated in step S102 is estimated to be the plane corresponding to the projection target, and is stored as the regression plane data. Then, the process of estimating the plane is finished ("END").

In step S109, the point of the three-dimensional point group corresponding to the maximum distance $D_{MAX}$ is removed from the three-dimensional point group. After the removing has been thus completed, the process proceeds to step S110.

In step S110, it is determined whether the number of the points of the three-dimensional point group is less than or equal to two. In a case where the number of points of the three-dimensional point group exceeds two, the process is returned to step S102. Then, a regression plane is again calculated in step S102 under the condition that the point corresponding to the distance $D_{MAX}$ has been removed.

Thus, the projection target is approximated by recursively calculating a regression plane. In a case where the number of points of the three-dimensional point group is less than or equal to two, the process proceeds to step S111.

In step S111, since the number of points of the three-dimensional point group is less than or equal to two, it is not possible to estimate the plane. At this time, "an operation error of plane estimation (or calibration)" or the like is output using the I/F part 180 or the like. Then, the process of estimating the plane is finished ("END").

In step S112, only the points of the three-dimensional point group which have been removed in step S109 are input (registered) to the plane estimation part 150 as new distance data to replace the existing distance data, and the process is returned to step S102. It is noted that a case where the determination result of step S107 is YES, and thus, step S112 is then carried out may be a case where, as in the above-mentioned example, the three-dimensional point group indicates points on a wall that exists on the back side of the projection target rather than points on the projection target.

In such a case, since the estimated plane corresponds to the above-mentioned wall, points on the projection target (instead of the points on the wall or the like) are removed in the repetitive loop operations of steps S105 NO→S109→S110→S102 through S105. Then, the determination result of step S105 becomes YES. Thus, many points included in the above-mentioned predetermined range have been removed accordingly so that the determination result of step S107 becomes YES.

Then, as mentioned above, in step S112, the distance data corresponding to the removed points of the three-dimensional point group is input, as new distance data to replace the existing distance data, to the plane estimation part 150, which then calculates a regression plane based on the thus input new distance data corresponding to the removed points of the three-dimensional point group. As mentioned above, in this case, the removed points of the three-dimensional point group correspond to points on the projection target, and as a result, the thus calculated regression plane corresponds to the projection target.

Further, in this case, in step S106, "the number of the points of the three-dimensional point group of the entirety of the taken image area" has been replaced by the number of the points which has been input as the new distance data in step S112 as mentioned above. Thus, the determination result of step S107 becomes NO.

Thus, the projector 100 according to the embodiments measures the distance to the projection target, and a plane, corresponding to the projection target can be estimated according to the regression analysis method (the repetitive loop of steps S105 NO→S109→S110→S102 through S105). Further, the projector according to the embodiments removes the corresponding points that exceed the predetermined distance (in step S109). Thus, it is possible to properly estimate a plane corresponding to the projection target even when an obstruction exists between the projector and the projection target or when a wall or the like is close to the back of the projection target.

It is noted that in the operations of estimating the plane, the corresponding points to be removed (in step S109) are not limited to those concerning an obstruction that may exist between the projector 100 and the projection target, a wall or the like that may exist on the back side of the projection target, and the corresponding points concerning something other than the projection target may be included in the corresponding points to be removed (in step S109).

(Operations of Focusing Adjustment)

Operations of the focusing adjustment part 160 moving the projection lens 121 and adjusting focusing of an image being projected will be described.

The focusing adjustment part 160 moves the projection lens 121 using the lens driving part 162 based on the information concerning the plane estimated by the plane estimation part 150 and adjusts focusing of an image being projected.

Specifically, the focusing adjustment part 160 can focus an image being projected onto the plane corresponding to the projection target based on the information concerning the plane estimated by the plane estimation part 150. Or, the focusing adjustment part 160 can calculate, using the estimated plane, the distance data concerning the projection target corresponding to the central position of the area at which the image has been projected, and adjust focusing of an image being projected, using the thus calculated distance data. The "central position" may be an average value of the points (positions) that indicate the maximum values and the minimum values of the x-coordinates and z-coordinates of the three-dimensional point group. Or, the "central position" may be an average value of all the points of the three-dimensional point group.

Thus, the projector according to the embodiments can adjust an image being projected based on the estimated plane corresponding to the projection target even when an obstruction exists between the projector and the projection target or a wall or the like is close to the back of the projection target. Further, the projector according to the embodiments can adjust focusing without being affected by a variation in brightness of the light being projected, an unevenness of the surface of the projection target and/or the like, by estimating a plane corresponding to the projection target.

(Operations of Correcting Image to be Projected)

Operations of the image shape changing amount calculation part 170 correcting an image to be projected based on the distance data calculated by the distance measuring part 140 and/or the plane estimated by the plane estimation part 150 will be described.

First, the projector 100 projects an image that is white throughout its area, as a predetermined pattern, using the projection part 120. Next, the image shape changing amount calculation part 170 generates image data concerning an area including the projection target, from the taken image data obtained by the image taking part 130. Further, the image shape changing amount calculation part 170 calculates the area corresponding to the projection target based on the regression plane data estimated by the plane estimation part 150 and the distance data calculated by the distance measuring part 140.

Specifically, the image shape changing amount calculation part 170 extracts the white area from the image concerning the generated image data, and determines the extracted white area as the area corresponding to the projection target. An area having brightness greater than or equal to a predetermined brightness may be determined as the "white area". Further, it is also possible to detect a part other than the white area and calculate the outline shape of the projection target. The "predetermined brightness" may be brightness that can be regarded as the surface of the projection target in the taken image, using numerical calculation, an experiment, and/or the like.

Next, the image shape changing amount calculation part 170 approximates the extracted outline shape of the white area to be a rectangle, and calculates the three-dimensional coordinates of the vertexes of the rectangle based on the estimated regression plane data and the calculated distance data. The positions at which edge strength obtained by edge detection is high and the edge direction is sharply changed may be determined as the vertexes of the rectangle. In a case where the vertexes of the rectangle cannot be extracted (in a case where there is no area at which edge strength is high, or the like), the contour of the three-dimensional point group on the estimated plane may be determined as the outline shape of the projection target, and the vertexes of the rectangle that is inscribed in the contour may be determined as the above-mentioned vertexes of the rectangle for which the three-dimensional coordinates are thus calculated.

A specific method of detecting edge strength may be a method using an edge detection filter. Specifically, as an edge detection filter (a 3×3 pixel spatial filter), the following formula (8) and formula (9) may be used, a sum of squares of the filter values may be used as the edge strength, and ratios of the edge strengths of the two edge detection filters may be used as the edge direction.

$$\begin{pmatrix} -1 & -1 & -1 \\ 0 & 0 & 0 \\ 1 & 1 & 1 \end{pmatrix} \quad (9)$$

$$\begin{pmatrix} -1 & 0 & 1 \\ -1 & 0 & 1 \\ -1 & 0 & 1 \end{pmatrix} \quad (10)$$

The formula (9) is an edge detection filter for detecting an edge in a vertical direction, and the formula (10) is an edge detection filter for detecting an edge in a horizontal direction.

Specifically, each of the edge detection filters is applied to the image data, and the nine filter values are thus obtained which correspond to the respective nine filter element values shown in the formulas (9) and (10). Each of the nine filter values indicates the product of the pixel value and the filter element value. Then, the sum of squares of the nine filter values indicates the edge strength, and the ratio of the edge strengths of the respective edge detection filters for the vertical and horizontal directions indicates the edge direction.

Next, the image shape changing amount calculation part 170 calculates a shape changing parameter (a projective transformation matrix, a keystone correction transformation matrix and/or the like) that is information for correcting the image to be projected, based on the calculated coordinates of the vertexes of the rectangle, and obtains the shape changing parameter as correction data. Then, the image shape changing amount calculation part 170 outputs the correction data to the projection part 120. At this time, the projection part 120 corrects (changes the shape of) an image to be projected based on the correction data, and projects the corrected image.

Thus, the projector 100 according to the embodiments can determine the outline shape of the projection target by estimating the plane corresponding to the projection target and generating the image data, correct the image to be projected into the image corresponding to the outline shape of the projection target, and project the corrected image.

(Program and Recording Medium Storing Program)

A program Pr according to the embodiments causes one or more processors to take an image of an area that includes a target (projection target) onto which an image is being projected; obtain taken image data; calculate distance data concerning a distance between the target and a position having taken the image, from the taken image data; estimate a plane corresponding to the target, from the distance data; and adjust focusing of the image being projected, based on information concerning the plane.

Thereby, the advantageous effect same as or similar to that of the projector 100 according to the embodiments can be obtained.

Also, it is possible to provide a computer readable recording medium Md that stores the program Pr.

As the recording medium Md, any computer readable medium may be used such as a flexible disk, a CD-ROM, a memory card, or the like.

(Embodiments)

Using embodiments of a projector and a projector system, a projector and a control method thereof will be described.

An embodiment is not limited to a projector, and any other arrangement may be an embodiment as long as the arrangement projects an image, video or the like onto a target, takes an image of the target, approximates the target by a plane, and adjusts focusing of the image or the like being projected.

[First Embodiment]

A projector 200 according to a first embodiment will be described.

(Configuration of Projector)

A configuration of the projector 200 according to the first embodiment is the same as the projector 100 of FIG. 1, and the duplicate description will be omitted.

(Operations of Adjusting Focusing of Image being Projected)

Using FIGS. 7 and 8, operations of the projector 200 adjusting focusing of an image being projected (operations in a calibration phase) will be described. According to the first embodiment, the projector 200 carries out recursively (repetitively) operations of estimating a plane corresponding to a target and operations of adjusting focusing corresponding to the target, using the plane estimation part 150 and the focusing adjustment part 160.

Figure 7:
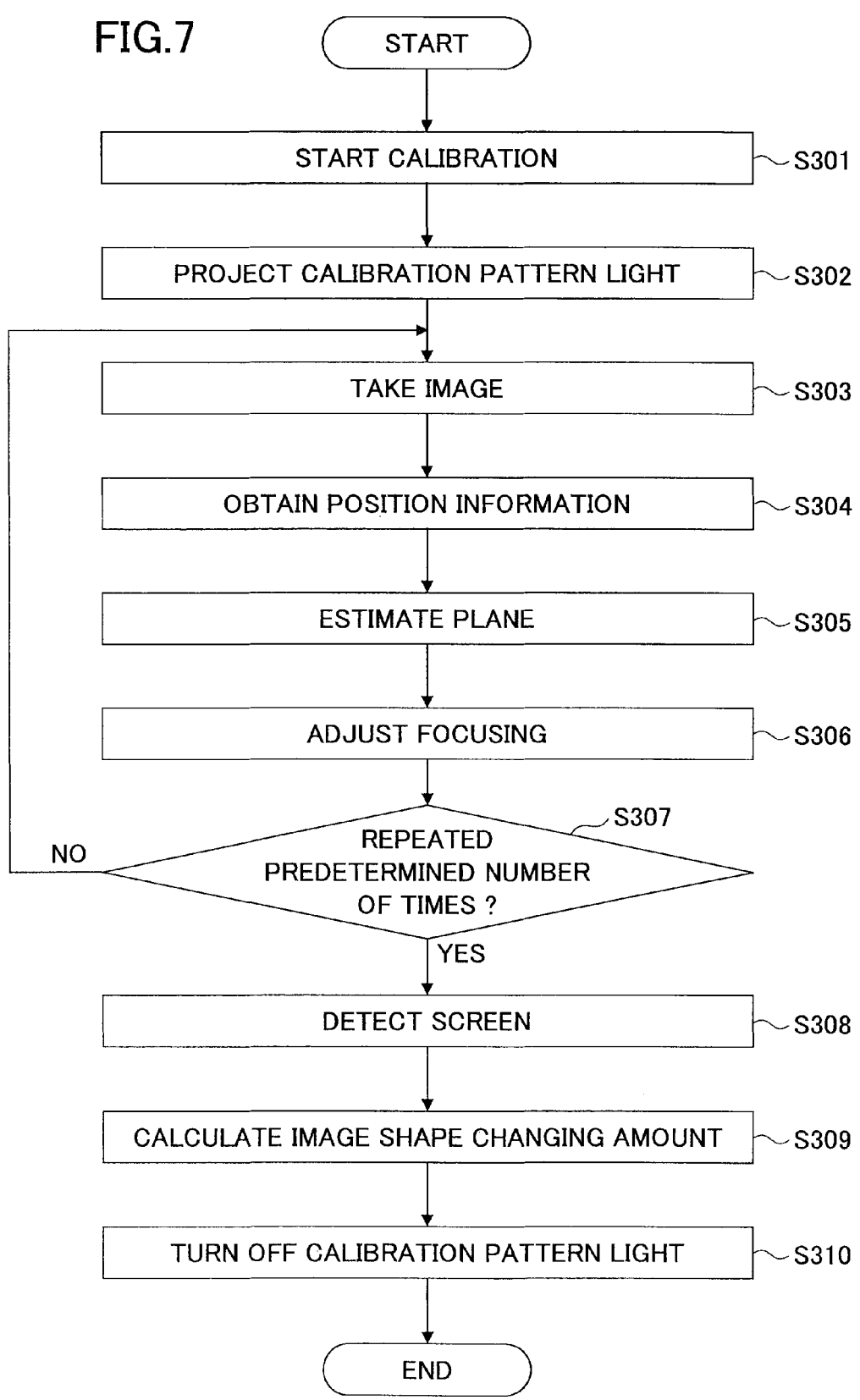
FIG. 7 is a flowchart showing one example of operations of a projector according to a first embodiment.

FIG. 7 is a flowchart showing a procedure of adjusting focusing of an image being projected at a time of calibration (or starting up) of the projector 200.

In step S301 of FIG. 7, the control part 110 starts calibration in response to an input from the operation panel 181 or the like. At this time, the control part 110 outputs an instruction to the projection part 120 and so forth for starting their operations. Then, the process proceeds to step S302.

In step S302, the projection part 120 projects a predetermined pattern stored in the calibration pattern storage part 127 onto a projection target via the projection lens 121. Then, the process proceeds to step S303.

In step S303, the image taking part 130 takes an image of an area including the projection target using the image taking parts A and B (131A and 131B), and stores the taken image in the taken image storage part 132. Operations of the image taking part taking an image will be described specifically using FIG. 8.

Figure 8:
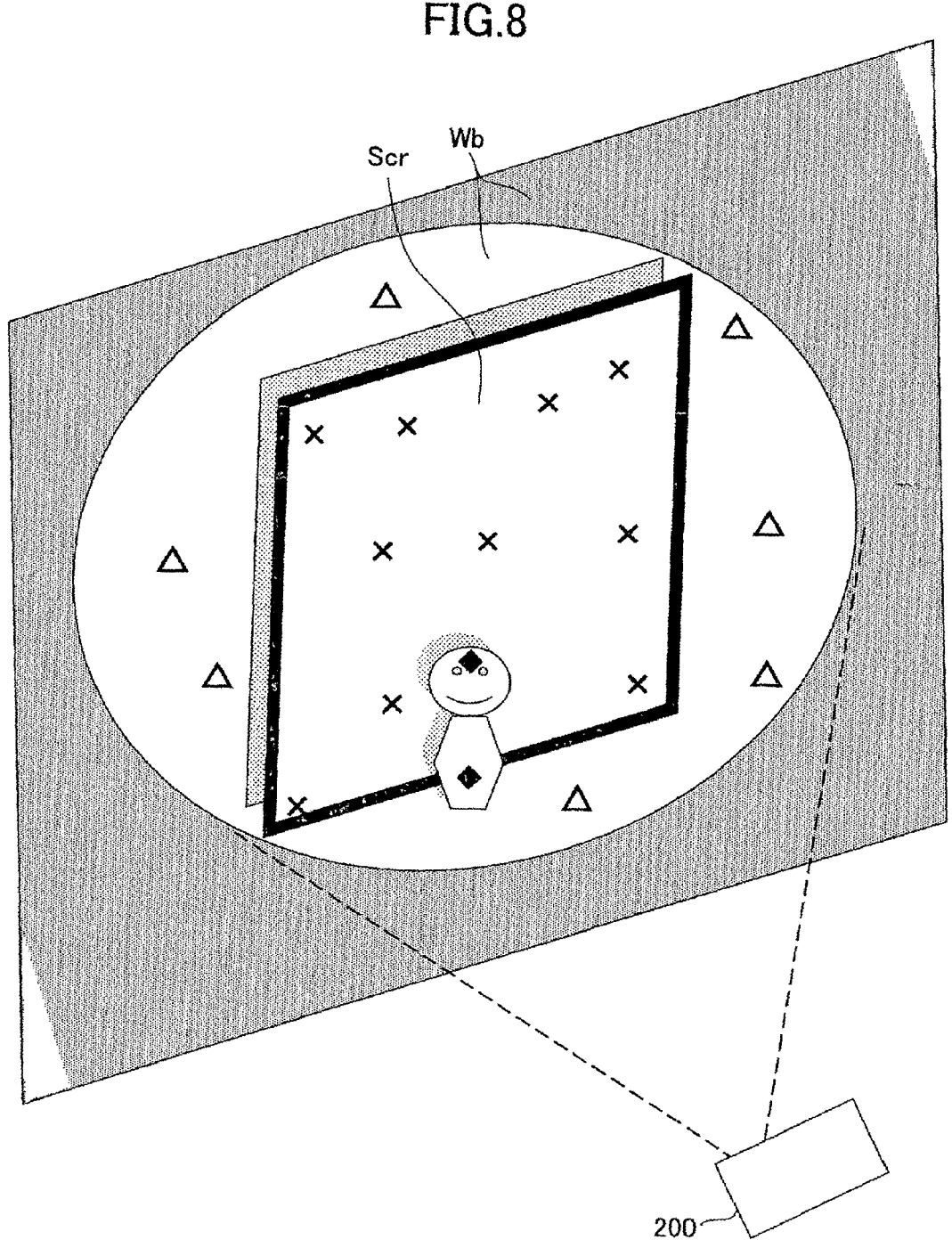
FIG. 8 illustrates one example of operations of projecting.

FIG. 8 illustrates operations of taking an image of the projection target. The sign "x" in FIG. 8 denotes a position on the surface of the projection target (a screen Scr). The sign "Δ" denotes a position on the surface of a wall Wb that exists on the back side of the projection target Scr. The sign "♦" denotes a position on a presenter.

In FIG. 8, the projector 200 (projection part 120) projects an image having a white area throughout an area to be projected. At this time, the projector 200 (projection part 120) takes an image of an area including the screen Scr onto which the image has been thus projected. Then, the process proceeds to step S304.

Next, in step S304 of FIG. 7, the distance measuring part 140 calculates, by the distance calculation part 141, the distance from the projector 200 to the projection target, and stores a calculation result (distance data) in the distance information storage part 142. A specific method of calculating the distance is the same as or similar to that of the above-mentioned (operations of extracting corresponding points) and (operations of calculating distance data), and description will be omitted. When storing of the calculation result has been thus completed, the process proceeds to step S305.

In step S305, the plane estimation part 150 estimates a plane corresponding to the projection target based on the distance data. A specific method of estimating the plane is the same as or similar to that of the above-mentioned (operations of estimating plane), so that its description will be omitted. When estimation of the plane has been thus completed, the process proceeds to step S306.

In step S306, the focusing adjustment part 160 moves the projection lens 121 with the lens driving part 162 based on information concerning the plane estimated by the plane estimation part 150 (step S305), and adjusts focusing of an image being projected. The operations of adjusting focusing is the same as or similar to that of the above-mentioned (operations of focusing adjustment), so that its description will be omitted. When focusing adjustment has been thus completed, the process proceeds to step S307.

In step S307, the control part 110 determines whether the number of times of having adjusted focusing is greater than or equal to a predetermined number of times. In a case of greater than or equal to the predetermined number of times (YES), the process proceeds to step S308. In the other case (NO), the process is returned to step S303.

The reason why focusing adjustment is carried out repetitively and recursively the predetermined number of times is that the measuring result may includes an error since the distance measuring part 140 may measure the distance to the projection target in a state of not necessarily being in focus at first a time of focusing adjustment. Thus, the focusing adjustment part 160 repeats focusing adjustment and plane estimation the predetermined number of times, and removes the error. The "predetermined number of times" may be determined using numerical calculation, an experiment and/or the like. Further, in a case of repeating focusing adjustment, the repeating of focusing adjustment may be terminated when a change in the distance measured by the distance measuring part 140 is less than or equal to a predetermined threshold.

Next, in step S308, the image shape changing amount calculation part 170 detects the outline shape of the projection target. A specific method of detecting the outline shape of the projection target is the same as or similar to that of the above-mentioned (operations of correcting image to be projected), so that its description will be omitted. When detection has been thus completed, the process proceeds to step S309.

In step S309, the image shape changing amount calculation part 170 calculates an image shape changing amount (correction data). A specific method of calculating an image shape changing amount is the same as or similar to that of the above-mentioned (operations of correcting image to be projected), so that its description will be omitted. When calculation has been thus completed, the process proceeds to step S310.

In step S310, the control part 110 finishes projection of the predetermined pattern by the projection part 120, and then, finishes the operations of adjusting focusing of an image being projected ("END").

Thus, the projector 200 according to the first embodiment can adjust (and calibrate) focusing of an image being projected, by estimating a plane corresponding to a projection target, even when an obstruction exists between the projector and the projection target or when a wall or the like is close to the back side of the projection target.

(First Variant of First Embodiment)

Operations of adjusting focusing during projection of an image (operations in an operating phase) according to a first variant of the first embodiment will be described.

(Configuration of Projector)

A configuration of a projector 300 according to the first variant of the first embodiment is the same as the projector 200 (FIG. 1) according to the first embodiment, and the duplicate description will be omitted.

(Operations of Adjusting Focusing During Projection)

Operations of adjusting focusing in a case where a projection target has been moved during projection or a case where the projector 300 has been moved during projection will now be described, using FIG. 9.

Figure 9:
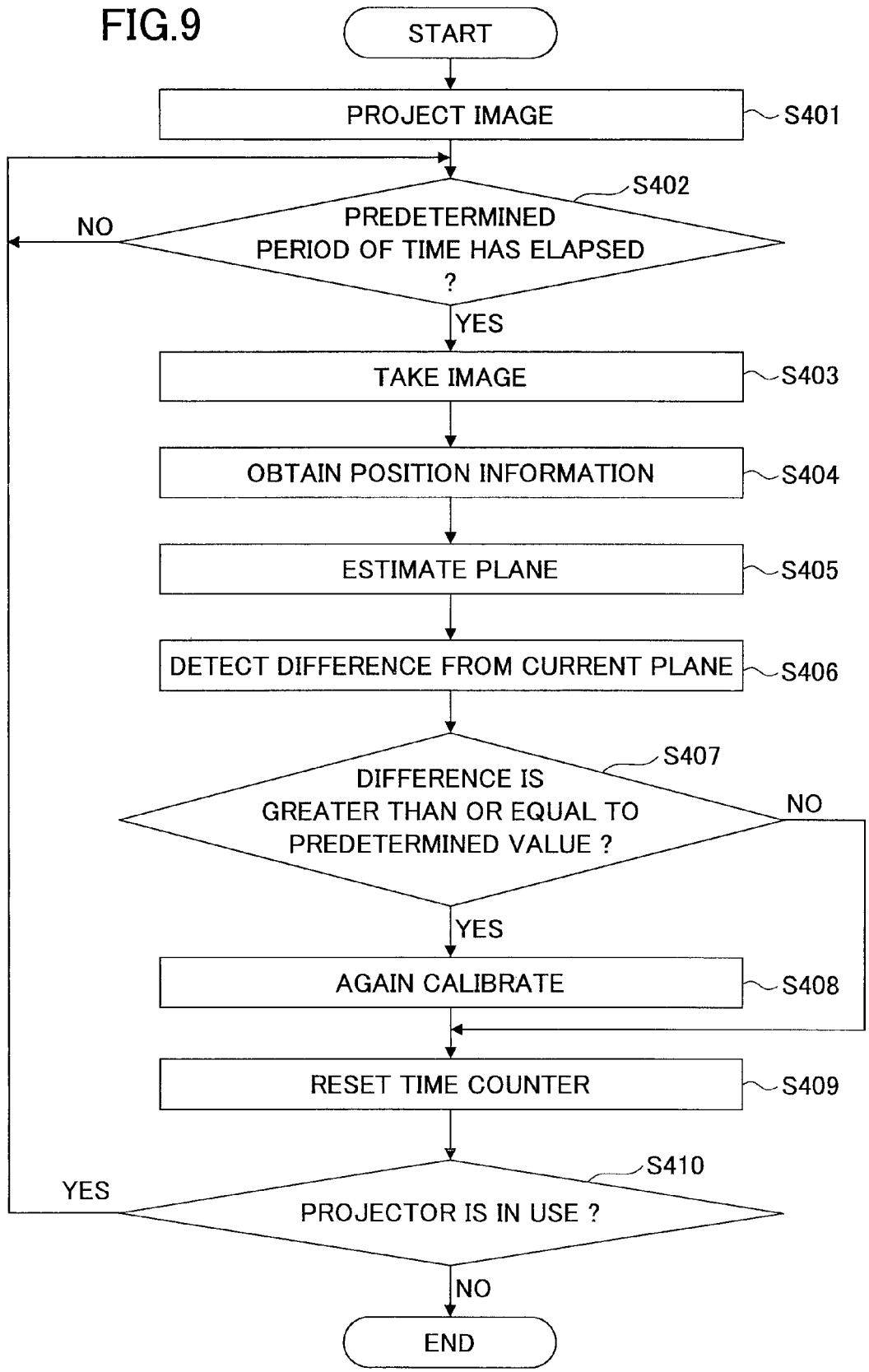
FIG. 9 is a flowchart showing one example of operations of a projector according to a first variant of the first embodiment.

FIG. 9 is a flowchart showing an example of a procedure of adjusting focusing of an image being projected while the image is being projected by the projector 300 according to the first variant of the first embodiment.

In step S401 of FIG. 9, the projection part 120 is projecting an image stored in the projection image storage part 125 onto the projection target. Next, the process proceeds to step S402.

In step S402, the control part 110 determines whether a predetermined period of time has elapsed, using a time counter that is used to measure the predetermined period of time. When the predetermined period of time has elapsed, the process proceeds to step S403. When the predetermined period of time has not elapsed yet, the elapse of the predetermined period of time is waited for.

In step S403, the image taking part 130 takes an image of an area including the projection target using the image taking parts A and B (131A and 131B), and stores the taken image in the taken image storage part 132. When storing has been thus completed, the process proceeds to step S404.

In step S404, the distance measuring part 140 calculates, by the distance calculation part 141, the distance from the projector 200 to the projection target, and stores a calculation result in the distance information storage part 142. A specific method of calculating the distance is the same as or similar to that of the above-mentioned (operations of extracting corresponding points) and (operations of calculating distance data), and its description will be omitted. When storing of the calculation result has been thus completed, the process proceeds to step S405.

In step S405, the plane estimation part 150 estimates a plane corresponding to the projection target based on the distance data. A specific method of estimating the plane is the same as or similar to that of the above-mentioned (operations of estimating plane), and its description will be omitted. When estimation of the plane has been thus completed, the process proceeds to step S406.

In step S406, the plane estimation part 150 compares the plane estimated in step S405 with the plane estimated in the previous time (or at a time of starting the projector 300), and calculates the difference in the positions of the planes. The difference in the positions of the planes may be the difference in the magnitudes (square root of sum of squares) of the normal vectors of the planes.

It is assumed that the plane estimated in step S405 is expressed by the following formula (11):

$$y = ax + bz + c \quad (11)$$

Also it is assumed that the plane estimated in the previous time is expressed by the following formula (12):

$$y = a_0 x + b_0 z + c_0 \quad (12)$$

At this time, the normal vectors of the planes are expressed by the following formula (13):

$$(a, -1, b), (a_0, -1, b_0) \quad (13)$$

When calculation of the difference in the positions of the planes has been thus completed, the process proceeds to step S407.

In step S407, the plane estimation part 150 determines that the projection target has been moved when the difference in the positions of the planes is greater than or equal to a predetermined value. The "predetermined value" may be a value corresponding to a distance between the projection target and the projector 300. Further, it is also possible that the "predetermined value" may be a value corresponding to the depth of field.

In a case where the difference in the positions of the planes is greater than or equal to the predetermined value (YES), the process proceeds to step S408. In a case where the difference in the positions of the planes is less than the predetermined value (NO), the process proceeds to step S409.

In step S408, the projector 300 carries out calibration again. Specifically, the calibration the same as or similar to the calibration that has been carried out at the time of starting the projector 300 (steps S303 through S309 in FIG. 7 according to the first embodiment) is carried out. Or, based on the plane estimated in step S405, calibration is carried out. It is noted that the projector 300 may interrupt the projection of an image, project the predetermined pattern and carry out the calibration.

When the calibration has been thus completed, the process proceeds to step S409.

In step S409, the control part 110 resets the time counter, and initializes measurement of the predetermined period of time. Then, the process proceeds to step S410.

In step S410, the control part 110 determines whether the projector 300 is in use. In a case where the projector 300 is in use (YES), the process is returned to step S402. In the other case (NO), the operations of adjusting focusing during projection are finished ("END").

(Second Variant of First Embodiment)

Operations of selecting a predetermined pattern according to operations of estimating a plane and operations of adjusting focusing, carried out recursively (repetitively) by the plane estimation part 150 and the focusing adjustment part 160, and adjusting focusing, according to a second variant of the first embodiment, will now be described.

(Configuration of Projector)

Since a configuration of a projector 400 according to the second variant of the first embodiment is the same as or similar to the projector 200 according to the first embodiment (FIG. 1), its description will be omitted.

(Operations of Selecting Predetermined Pattern and Adjusting Focusing)

Operations of selecting a predetermined pattern (a calibration pattern or the like) and adjusting focusing will now be described using FIGS. 10, 11A, 11B and 11C.

Figure 10:
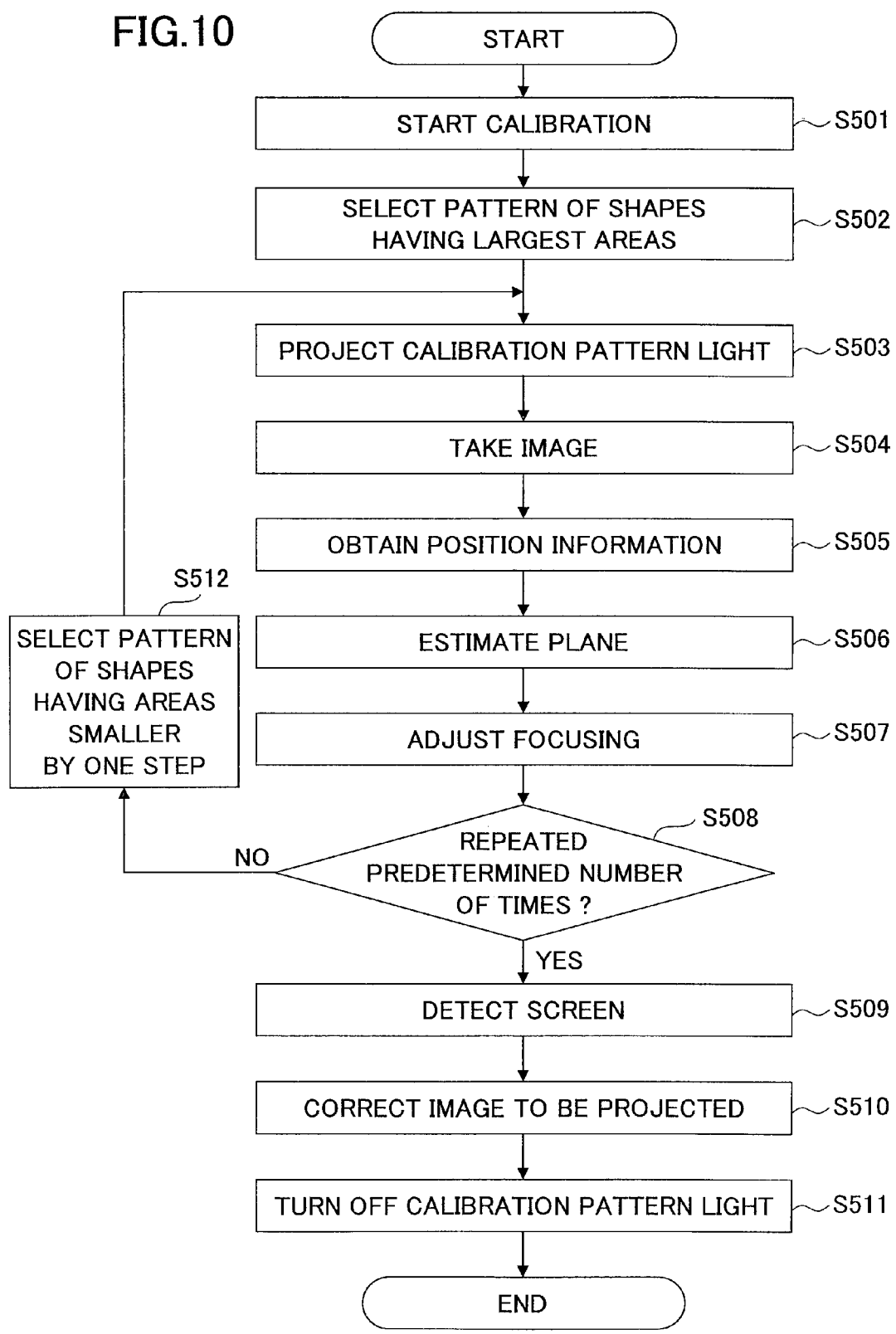
FIG. 10 is a flowchart showing one example of operations of a projector according to a second variant of the first embodiment.

FIG. 10 is a flowchart showing an example of a procedure of adjusting focusing of an image being projected in the projector 400 according to the second variant of the first embodiment.

In step S501 of FIG. 10, the control part 110 starts calibration in response to an input from the operation panel 181 or the like. At this time, the control part 110 outputs an instruction to the projection part 120 and so forth for starting their operations. Then, the process proceeds to step S502.

In step S502, the projection part 120 selects a pattern that includes shapes each having the largest area from among predetermined patterns stored in the calibration pattern storage part 127. Then, the process proceeds to step S503. The reason why the pattern that includes shapes each having the largest area is selected in the first time of focusing adjustment is that the distance measuring part 140 can extract the corresponding points even when focusing adjustment has not been carried out yet.

Figure 11A:
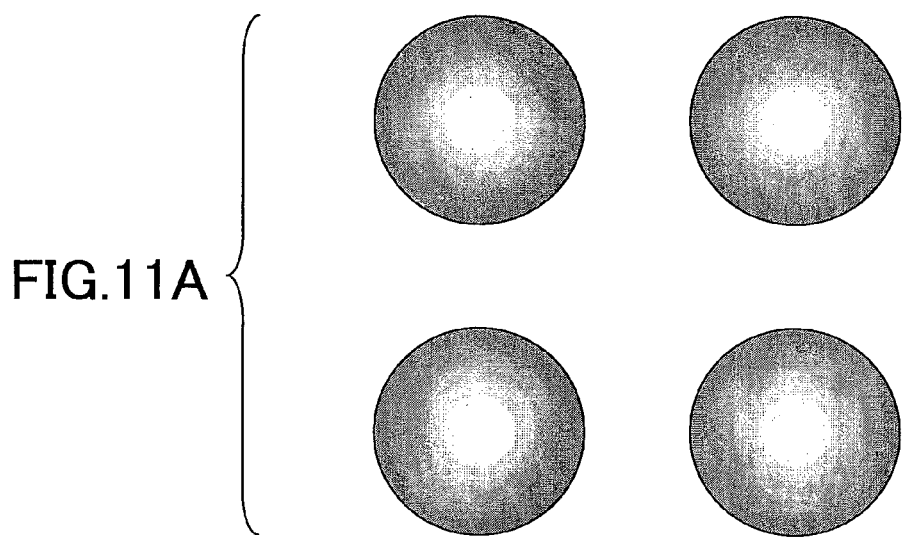
FIGS. 11A, 11B and 11C illustrate examples of predetermined patterns according to the second variant of the first embodiment.
Figure 11B:
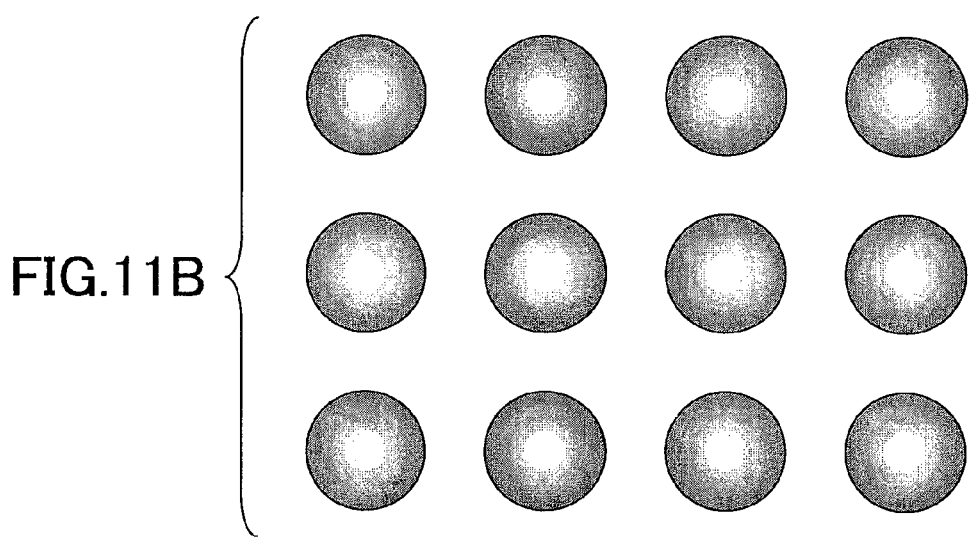
Figure 11C:
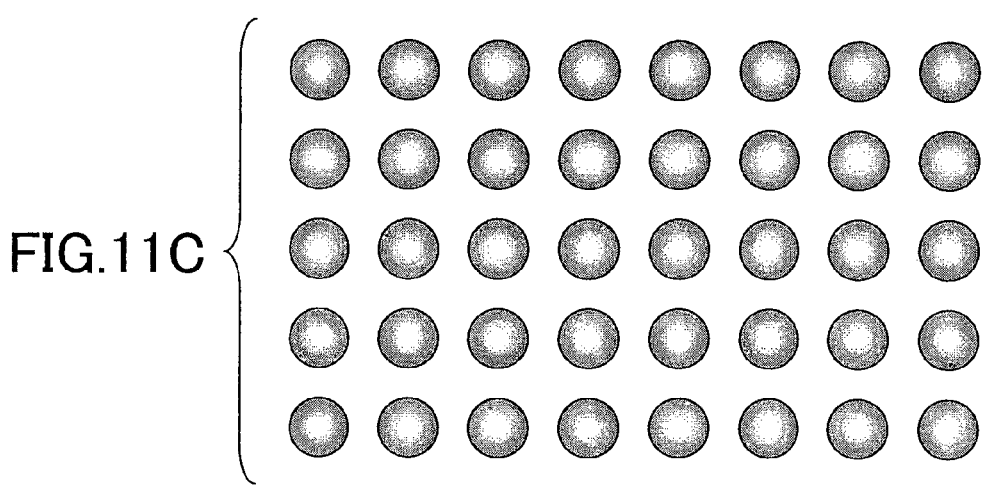

FIGS. 11A, 11B and 11C show examples of patterns having circular shapes as the predetermined patterns to be selected by the projection part 120. FIG. 11A is a pattern having circular shapes having the largest areas. FIG. 11B is a pattern having circular shapes having medium areas. FIG. 11C is a pattern having circular shapes having smaller areas.

The diameter of each circular shape may be in a range from a size such that an image of one circular shape formed on the image sensor is the same as one (1 pixel) of the light reception elements of the image sensor (image taking part 130) to a size such that three circular shapes can be projected onto the projection target. Further, the predetermined patterns may be those including shapes that have the sizes (the diameters of the circular shapes, or the like) which are changeable by an optical system, image processing or the like.

Next, steps S503 through S507 are the same as or similar to steps S302 through S306 of the first embodiment, and thus, its descriptions will be omitted. Then, the process proceeds to step S508.

In step S508, the control part 110 determines whether the number of times of having adjusted focusing by the focusing adjustment part 160 is greater than or equal to a predetermined number of times. In a case of greater than or equal to the predetermined number of times (YES), the process proceeds to step S509. In the other case (NO), the process proceeds to step S512.

The reason why focusing adjustment is thus repeated the predetermined number of times is that adjustment may include an error at the first time since the pattern including the circular shapes having the largest areas is used. Thus, the focusing adjustment part 160 and the plane estimation part 150 repeat focusing adjustment and plane estimation the predetermined number of times, and the areas of the circular shapes included in the selected predetermined pattern are gradually reduced. Thus, the error can be removed. The "predetermined number of times" may be determined using numerical calculation, an experiment, and/or the like.

Next, steps S509 through S511 are substantially the same as steps S308 through S310 of the first embodiment, and thus, its descriptions will be omitted. Then, the operations of adjusting focusing of an image being projected are finished ("END").

In step S512, the projection part 120 selects the pattern including shapes having the areas immediately smaller compared to those of the pattern selected in the immediately previous time from among the predetermined patterns stored in the calibration pattern storage part 127. Then, the process proceeds to step S503.

[Second Embodiment]

A projector system according to a second embodiment will now be described.

(Configuration of Projector System)

Figure 12:
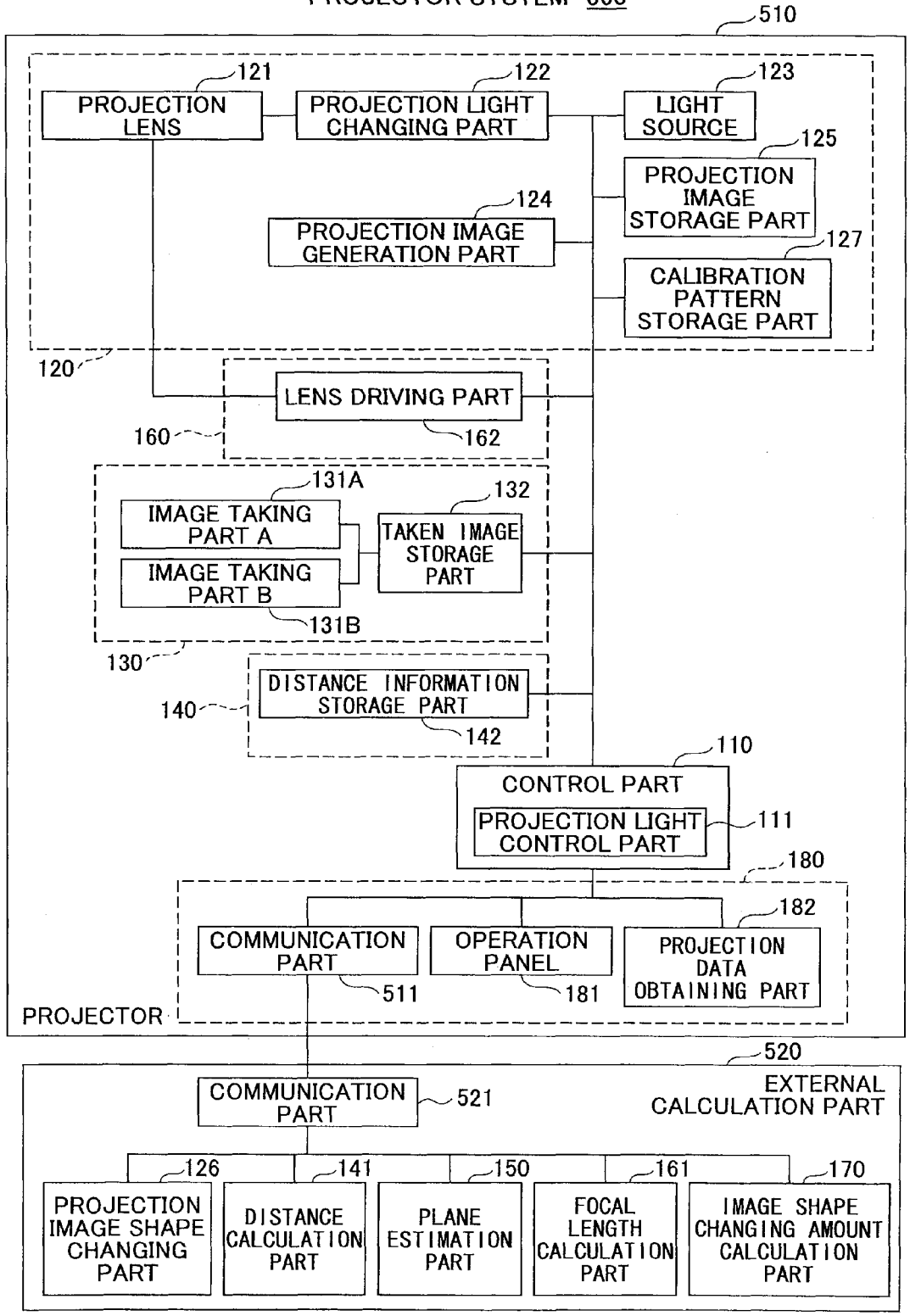
FIG. 12 shows a general configuration of one example of a projector system according to a second embodiment.

FIG. 12 is an example of a general configuration of a projector system 500 according to the second embodiment.

In FIG. 12, the projector system 500 includes a projector 510 and an external calculation part 520. The basic configuration of the projector 510 is the same as or similar to the projector 200 according to the first embodiment, and thus, its description will be omitted.

The projector 510 includes a communication part 511. The external calculation part 520 also includes a communication part 521. The projector 510 and the external calculation part 520 can mutually communicate by wire or wireless communication using the communication parts 511 and 521. The external calculation part 520 may be realized using cloud computing or the like.

The external calculation part 520 includes a projection image shape changing part 126, a distance calculation part 141, a plane estimation part 150, a focal length calculation part 161 and an image shape changing amount calculation part 170. The external calculation part 520 can carry out calculation processes based on information that is output by the projector 510 such as calculation of distance data, estimation of a plane, calculation of information concerning focusing adjustment and calculation of information concerning correction of an image to be projected. Further, the external calculation part 520 corrects an image to be projected by the projection image shape changing part 126 based on the information concerning correction, and outputs data concerning the corrected image to the projector 510 (the projection image storage part 125). The external calculation part 520 may have a configuration that has at least one of the projection image shape changing part 126 and so forth.

Thus, in the projector system 500, by using the external calculation part 520, it is possible to reduce the processing amount of the projector 510, and it is possible to miniaturize, reduce the weight of and simplify the projector 510. Further, it is possible to use a personal computer (PC) or the like as the external calculation part 520. In a case where a presenter carries out presentation or the like using the projector 10, a PC or the like used for the presentation can also be used as the external calculation part 520. Further, the external calculation part 520 may include another part(s) such as the image taking part 130 of the projector 510.

According to the embodiments described above, it is possible to carry out adjustment of focusing by estimating a target by a plane, in a projector.

Although the projectors and the control methods thereof have been described as the embodiments, the present invention is not limited to the embodiments, and variations and modifications may exist within the scope and spirit of the invention as described and defined in the following claims.

The present application is based on Japanese Priority Application No. 2011-178808 filed on Aug. 18, 2011, the entire contents of which are hereby incorporated herein by reference.

PATENT REFERENCE

Patent reference No. 1: Japanese Laid-Open Patent Application No. 6-27431

Patent reference No. 2: Japanese Laid-Open Patent Application No. 2006-10945

Patent reference No. 3: Japanese Laid-Open Patent Application No. 2005-181726

The invention claimed is:

1. A projector comprising:
an image taking part that takes an image of an area that includes a target onto which an image is being projected;
a distance measuring part that calculates, from taken image data obtained by the image taking part, distance data concerning a distance between the target and the image taking part;
a plane estimation part that estimates, from the distance data, a plane corresponding to the target; and
a focusing adjustment part that adjusts focusing of the image being projected, based on information concerning the plane, wherein
the distance measuring part calculates, from the taken image data, plural sets of the distance data concerning plural positions corresponding to the target,
the plane estimation part removes the distance data concerning positions of the plural positions having a distance apart from the plane which is greater than a predetermined distance,
the plane estimation part calculates the number of the sets of the remaining distance data having the positions that exist in a predetermined range from the center of the area, and calculates a ratio of the calculated number of the sets of the remaining distance data to the number of the plural sets of the distance data, and
the plane estimation part recursively approximates the plane based on the remaining distance data when the calculated ratio is greater than a predetermined ratio.

2. The projector as claimed in claim 1, wherein
the plane estimation part recursively approximates the plane based on the removed distance data in a case where the calculated ratio is less than or equal to the predetermined ratio.

3. The projector as claimed in claim 1, wherein
the plane estimation part and the focusing adjustment part recursively carry out operations of estimating the plane corresponding to the target and operations of adjusting focusing corresponding to the target.

4. The projector as claimed in claim 1, further comprising a projection part that projects a predetermined pattern.

5. The projector as claimed in claim 4, wherein
the projection part selects the predetermined pattern according to operations of estimating the plane and the operations of adjusting focusing recursively carried out by the plane estimation part and the focusing adjustment part.

6. The projector as claimed in claim 1, wherein
the plane estimation part estimates the plane based on at least one of plural items of information of the taken image data concerning color, brightness and edge strength.

7. The projector as claimed in claim 1, further comprising:
a projection image shape changing part that corrects the image to be projected.

8. A control method of a projector comprising:
taking an image of an area that includes a target onto which an image is being projected, and obtaining taken image data;
calculating, from the taken image data, distance data concerning a distance between the target and a position of having taken the image;
estimating, from the distance data, a plane corresponding to the target; and
adjusting focusing of the image being projected, based on information concerning the plane, wherein
the calculating the distance data includes calculating, from the taken image data, plural sets of the distance data concerning plural positions corresponding to the target,
the estimating the plane includes removing the distance data concerning positions of the plural positions having a distance apart from the plane which is greater than a predetermined distance,
the estimating the plane includes calculating the number of the sets of the remaining distance data having the positions that exist in a predetermined range from the center of the area, and calculating a ratio of the calculated number of the sets of the remaining distance data to the number of the plural sets of the distance data, and
the estimating the plane includes recursively approximating the plane based on the remaining distance data when the calculated ratio is greater than a predetermined ratio.

9. The control method as claimed in claim 8, wherein
the estimating the plane include recursively approximating the plane based on the removed distance data in a case where the calculated ratio is less than or equal to the predetermined ratio.

10. The control method as claimed in claim 8, wherein
the estimating the plane and the adjusting focusing are recursively carried out.

11. The control method as claimed in claim 8, further comprising projecting a predetermined pattern.

12. The control method as claimed in claim 11, wherein
the projecting the predetermined pattern including selecting the predetermined pattern according to the estimating the plane and the adjusting focusing being recursively carried out.

13. The control method as claimed in claim 8, wherein
the estimating the plane includes estimating the plane based on at least one of plural items of information of the taken image data concerning color, brightness and edge strength.

* * * * *